(12) United States Patent
Eaves

(10) Patent No.: US 10,468,879 B2
(45) Date of Patent: Nov. 5, 2019

(54) METHOD AND APPARATUS FOR PARALLEL OPERATION OF PACKET ENERGY TRANSFER RECEIVERS

(71) Applicant: VoltServer, Inc., East Greenwich, RI (US)

(72) Inventor: Stephen Spencer Eaves, Charlestown, RI (US)

(73) Assignee: VoltServer, Inc., East Greenwich, RI (US)

( * ) Notice: Subject to any disclaimer, the term of this patent is extended or adjusted under 35 U.S.C. 154(b) by 242 days.

(21) Appl. No.: 15/412,219

(22) Filed: Jan. 23, 2017

(65) Prior Publication Data

US 2017/0214236 A1    Jul. 27, 2017

Related U.S. Application Data

(60) Provisional application No. 62/286,395, filed on Jan. 24, 2016.

(51) Int. Cl.
| | |
|---|---|
| *H02J 1/04* | (2006.01) |
| *H02H 3/00* | (2006.01) |
| *H04B 3/54* | (2006.01) |
| *H02J 13/00* | (2006.01) |

(52) U.S. Cl.
CPC ............ *H02J 1/04* (2013.01); *H02H 3/00* (2013.01); *H04B 3/54* (2013.01); *H02J 13/0003* (2013.01); *Y02B 90/228* (2013.01); *Y04S 20/18* (2013.01)

(58) Field of Classification Search
USPC ..................................................... 361/62–69
See application file for complete search history.

(56) References Cited

U.S. PATENT DOCUMENTS

| | | |
|---|---|---|
| 5,944,831 A | 8/1999 | Pate et al. |
| 6,735,447 B1 | 5/2004 | Muller |
| 2009/0204268 A1 | 8/2009 | Eaves |

(Continued)

OTHER PUBLICATIONS

USPTO, International Search Report and Written Opinion for PCT/US1714542 dated (Apr. 14, 2017) (corresponding PCT application).

(Continued)

*Primary Examiner* — Danny Nguyen
(74) *Attorney, Agent, or Firm* — Modern Times Legal; Robert J. Sayre

(57) ABSTRACT

A digital power distribution system comprises a digital power transmitter configured to accept analog electrical power and to convert the analog electrical power into discrete energy packets for distribution across a common set of transmission lines; a plurality of digital power receivers with parallel connections to the transmission lines, wherein the digital power receivers are configured to accept the energy packets from the digital power transmitter and to convert the packets back into analog electrical power for use by the load device; a load device electrically coupled with at least one of the digital power receivers and configured to receive analog electrical power from the digital power receiver with which it is electrically coupled; and a termination module with parallel connections to the transmission lines, wherein the termination module includes at least a capacitor configured to establish the characteristic capacitance of the transmission lines.

9 Claims, 3 Drawing Sheets

(56) References Cited

U.S. PATENT DOCUMENTS

| | | |
|---|---|---|
| 2012/0075759 A1 | 3/2012 | Eaves |
| 2013/0103220 A1 | 4/2013 | Eaves |
| 2014/0217967 A1 | 8/2014 | Zeine et al. |
| 2014/0258132 A1 | 9/2014 | Swamy et al. |
| 2015/0207318 A1 | 7/2015 | Lowe et al. |
| 2015/0215001 A1 | 7/2015 | Eaves |
| 2016/0134331 A1 | 5/2016 | Eaves |
| 2016/0294568 A1* | 10/2016 | Chawgo .................. H04L 12/10 |

OTHER PUBLICATIONS

European Patent Office, extended European Search Report for EP 17742097.3 (corresponding European application) (Apr. 26, 2019).

\* cited by examiner

METHOD AND APPARATUS FOR PARALLEL OPERATION OF PACKET ENERGY TRANSFER RECEIVERS

RELATED APPLICATION

This application claims the benefit of U.S. Provisional Application No. 62/286,395, filed 24 Jan. 2016, the entire content of which is incorporated herein by reference.

FIELD OF INVENTION

This invention includes a method and apparatus for powering multiple, parallel power receiver circuits as part of a digital power distribution system using packet energy transfer protocol. Digital electricity can be characterized as any format where electric power is distributed in discrete, controllable units of energy. Packet energy transfer (PET) is a new digital electricity protocol that has been previously disclosed in U.S. Pat. No. 8,068,937, "Power Distribution System with Fault Protection Using Energy Packet Confirmation", U.S. Pat. No. 8,781,637, "Safe Exposed Conductor Power Distribution System", published U.S. Pat. application No. US 2015/0207318 A1, "Digital Power Network Method and Apparatus", U.S. patent application Ser. No. 14/886,455, "Digital Power Receiver System", and U.S. Pat. No. 9,184,795 B2, "Packet Energy Transfer In-line Communications".

In particular embodiments, this invention relates to an enhancement to previous disclosures by providing a method and apparatus for powering multiple PET receiver circuits that are connected in parallel to a common transmission line.

BACKGROUND

A representative digital power distribution system using PET protocol is described in U.S. Pat. No. 8,781,637 filed in 2012 (Eaves 2012). The primary discerning factor in a digital power transmission system compared to traditional, analog power systems is that the electrical energy is separated into discrete units, and individual units of energy can be associated with analog and/or digital information that can be used for the purposes of optimizing safety, efficiency, resiliency, control or routing.

In apparatus described in Eaves 2012, a source controller and a load controller are connected by power transmission lines. The source controller of Eaves 2012 periodically isolates (disconnects) the power transmission lines from the power source and analyzes, at a minimum, the voltage characteristics present at the source controller terminals directly before and after the lines are isolated. The time period when the power lines are isolated was referred to in Eaves 2012 as the "sample period," and the time period when the source is connected is referred to as the "transfer period". The rate of rise and decay of the voltage on the lines before, during and after the sample period reveal if a fault condition is present in or across the power transmission lines. Measurable faults include, but are not limited to, short circuit, high line resistance or the presence of an individual who has improperly come in contact with the lines. Since the energy in a PET system is transferred as discrete quantities, or quanta, it can be referred to as "digital power".

A representative digital power distribution system, as originally described in Eaves 2012, is shown in FIG. 1. The system is comprised of a source 1 and at least one load 2. The source 1 is an analog power source, meaning that the electrical power is delivered in a continuously variable format, as is the standard worldwide in today's analog power distribution systems. For example, 120 VAC, 60 HZ is an analog power distribution system format.

The PET protocol is initiated by operating the switch 3 via the source controller 11 to periodically disconnect the source 1 from the power transmission lines via an on/off signal 20. The combination of a switch 3 and the source controller 11 can be collectively referred to as a transmitter 16.

When the switch 3 is in an open (non-conducting) state, the power transmission lines are also isolated from any stored energy that may reside at the load 2 by an isolation diode 4. A load-side capacitor 5 is representative of an energy storage element on the load side of the circuit. The power transmission lines have inherent line-to-line resistance and capacitance, respectively represented by transmission-line resistor 6 and transmission-line capacitor 7. The PET system architecture, as described in Eaves 2012, can insert additional line-to-line resistance (via an additional resistor 8) and capacitance (via an additional capacitor 9). The combination of the isolation diode 4, load-side capacitor 5, and additional capacitor 9 can be collectively referred to as a receiver 12.

At the instant when the switch 3 is opened, the transmission-line capacitor 7 and the additional capacitor 9 have stored charge that decays at a rate that is inversely proportional to the additive values of resistances provided by the transmission-line resistor 6 and the additional resistor 8. The load-side capacitor 5 does not discharge through the additional resistor 8 or through the transmission-line resistor 6 due to the reverse blocking action of the isolation diode 4. The amount of charge contained in the transmission-line capacitor 7 and the additional capacitor 9 is proportional to the voltage across them. The voltage can be measured at point 10 by the source controller 11 via a voltage signal 21 communicated from point 10 to the source controller 11.

As described in Eaves 2012, a change in the rate of decay of the energy stored in the transmission line capacitor 7 and in the additional capacitor 9 can indicate that there is a cross-line fault on the transmission lines. The difference between normal operation and a fault, as presented by Eaves 2012 is illustrated by the plot of voltage over time shown in FIG. 2, where the voltage drop, $\Delta V$, during normal operation (as shown in the first sample period) can be seen to be significantly less than the voltage drop, $\Delta V$, with the cross-line fault (as shown in the second sample period).

SUMMARY

Apparatus and methods for parallel operation of packet energy transfer receivers are described herein, where various embodiments of the apparatus and methods may include some or all of the elements, features and steps described below.

A digital power distribution system, comprises a common set of transmission lines; a digital power transmitter configured to accept analog electrical power and to convert the analog electrical power into discrete energy packets for distribution across the common set of transmission lines; a plurality of digital power receivers with parallel connections to the common set of transmission lines, wherein the digital power receivers are configured to accept the energy packets from the digital power transmitter and to convert the packets back into analog electrical power; a load device electrically coupled with at least one of the digital power receivers and configured to receive analog electrical power from the digital power receiver with which it is electrically coupled; and a termination module with parallel connections to the common set of transmission lines, wherein the termination module includes at least a capacitor configured to establish the characteristic capacitance of the transmission lines.

Each digital power receiver can include a controller configured to monitor at least that digital power receiver's electrical current and to disconnect that digital power receiver's output from the load device if the electrical current is greater than a predetermined maximum value.

A loss of connection to the termination module can result in a change in the characteristic capacitance or resistance of the transmission lines, the digital power transmitter can be configured to act to interrupt power supply to the transmission lines if the characteristic capacitance falls outside of predetermined high or low limits maintained by the digital power transmitter.

In particular embodiments, at least one of the digital power receivers is in communication with the digital power transmitter to communicate parameters that include at least one of the electrical current, voltage and power being drawn by the load connected to the receiver or a unique identifier for the digital power receiver; and the digital power transmitter can configured to inhibit power to the transmission lines unless the electrical power being supplied by the digital power transmitter correlates to the summation of individual power levels that are reported by the digital power receiver. The digital power transmitter can also be configured to not provide power to the transmission lines unless the electrical power being supplied by the digital power transmitter corresponds to the summation of individual power levels that are reported by all of the digital power receivers and unless all of the unique identifiers reported by the digital power receivers correspond to a list of acceptable identifiers maintained in the digital power transmitter.

In additional embodiments, the termination module is a dongle in communication with the digital power transmitter and is configured to communicate a unique identifier for the dongle, and wherein the digital power transmitter is configured act to interrupt power to the transmission lines if the unique dongle identifier is not detected.

Figure 1:
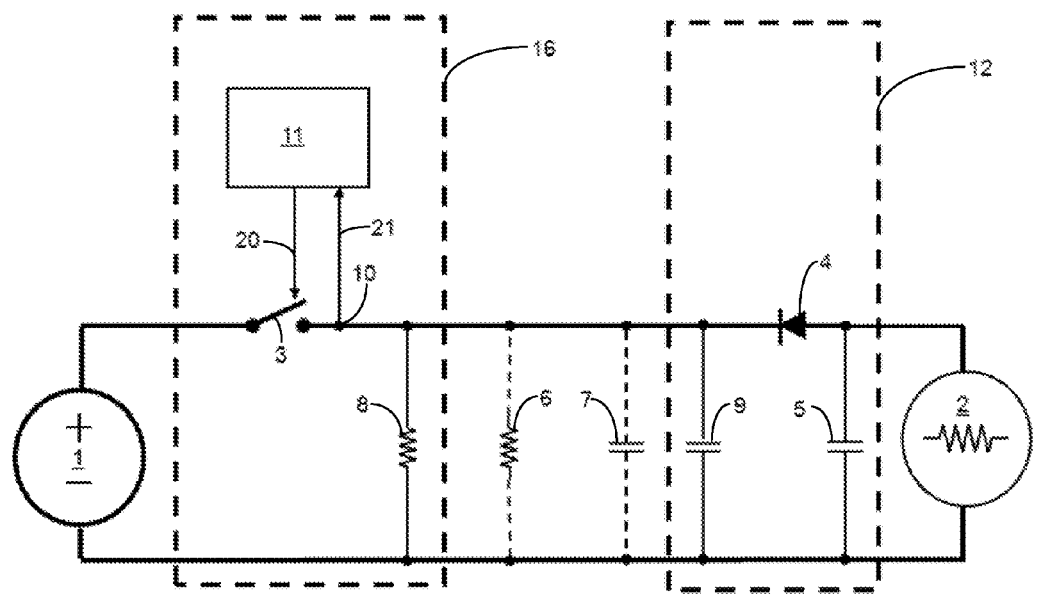
FIG. 1 is a schematic illustration of a digital power system comprising a transmitter 16, a receiver 12, a source disconnect switch 3, and an isolation diode 4 acting as a load disconnect device.
Figure 2:
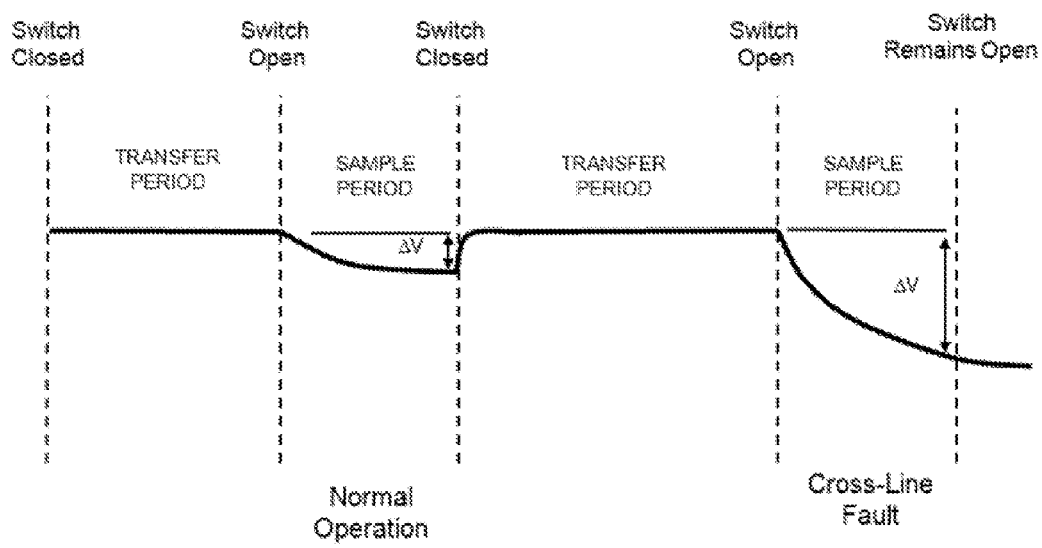
FIG. 2 is a plot of voltage over time, illustrating the difference between normal operation and a fault.

In the accompanying drawings, like reference characters refer to the same or similar parts throughout the different views; and apostrophes are used to differentiate multiple instances of the same or similar items sharing the same reference numeral. The drawings are not necessarily to scale; instead, emphasis is placed upon illustrating particular principles in the exemplifications discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise herein defined, used or characterized, terms that are used herein (including technical and scientific terms) are to be interpreted as having a meaning that is consistent with their accepted meaning in the context of the relevant art and are not to be interpreted in an idealized or overly formal sense unless expressly so defined herein. Processes, procedures and phenomena described below can occur at ambient pressure (e.g., about 50-120 kPa—for example, about 90-110 kPa) and temperature (e.g., −20 to 50° C.—for example, about 10-35° C.) unless otherwise specified.

Spatially relative terms, such as "above," "below," "left," "right," "in front," "behind," and the like, may be used herein for ease of description to describe the relationship of one element to another element, and/or the Figures may provide such spatial arrangements. It will be understood that the spatially relative terms, as well as the illustrated configurations, are intended to encompass different orientations of the apparatus in use or operation in addition to the orientations described herein and depicted in the Figures. For example, if the apparatus in the Figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to," "coupled to," "in contact with," etc., another element, it may be directly on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

Again referring to FIG. 1, Eaves 2012 describes a digital power system comprising a transmitter 16 and a receiver 12; when the source disconnect switch 3 is in an open (non-conducting) state, the transmission lines are isolated from any stored energy that may reside on the load side by isolation diode 4 referred to in Eaves 2012 as the load disconnect device. The load-side capacitor 5 is representative of an energy storage element on the load side of the circuit that supports the load during the time when the transmission lines are isolated, defined in Eaves 2012 as the sample period. The decay characteristics of the transmission lines during the sample period can be adjusted by setting the values of the additional resistor 8 and of the additional capacitor 9.

Figure 3:
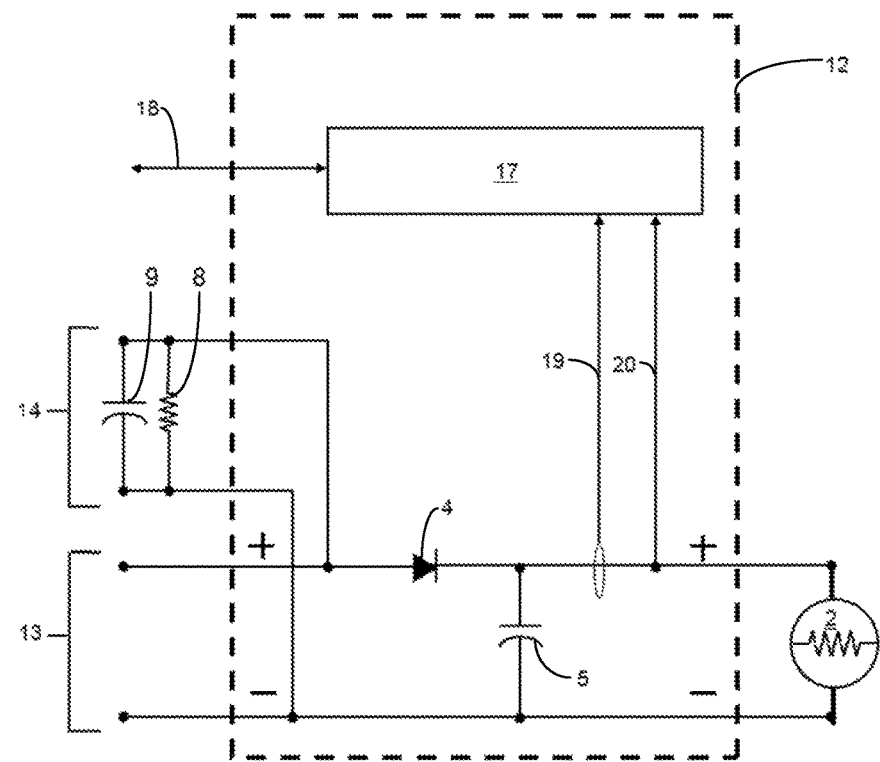
FIG. 3 is a schematic illustration showing safe and effective parallel operation of multiple receivers 12 on the same set of transmission lines as a result of separate connection terminals for input 13 and output 14 of the PET transmission lines.

A configuration described herein defines a parallel group of receivers, where each receiver 12 comprises, as a minimum, a load disconnect device 4 (e.g., a diode) and an additional capacitor 9, as shown in FIG. 3. The receiver 12 may optionally have a load controller 17 that can measure voltage and current and calculate power based on those measurements. Additional embodiments of individual digital power receivers 12 are described in U.S. Pat. No. 9,419,436 B2. As an example of an embodiment described in U.S. Pat. No. 9,419,436 B2, the receiver output can be turned on or off by the receiver control circuitry. This embodiment may prove important in applications where one receiver 12 is drawing above its rated power. The individual receiver controller 17 receives readings of current 19 and voltage 20 (from sensors) in the output lines of the receiver 12. By using the individual receiver controller 17 to turn off the load for that one receiver 12, it avoids a possible overload of the transmitter circuit and subsequent shut-down of all of the receivers 12 that are attached to that transmitter circuit.

Figure 4:
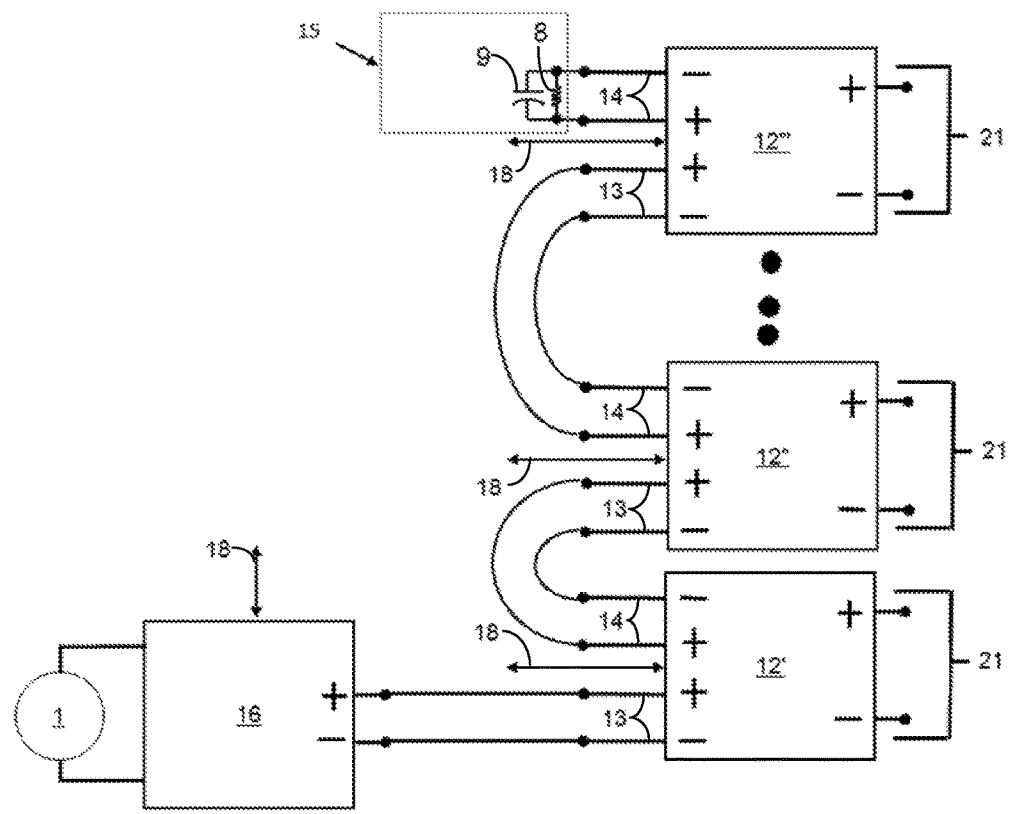
FIG. 4 is a schematic illustration of an embodiment in which an additional resistor 8 and capacitor 9 are placed only on the output terminals 14 of the last receiver 12''' in a parallel group and incorporated as a separate termination module or "dongle" 15.

Referring to FIG. 4, the method and apparatus can be employed to allow safe and effective parallel operation of multiple receivers 12 on the same set of transmission lines as a result of separate connection terminals for input 13 and output 14 of the PET transmission lines. In FIG. 3, the additional resistor 8 and the additional capacitor 9 have been placed external to the receiver 12. If the additional resistor 8 and capacitor 9 were placed internal to the receivers 12, the total resistance in the transmission line would be decreased and total capacitance would be increased each time another parallel receiver 12 was attached to the transmission lines. Referring to FIG. 4, the additional resistor 8 and capacitor 9 are only placed on the output terminals 14 of the last receiver 12''' in the parallel group (with a chain of PET inputs 13 and outputs 14 through the receivers 12 and analog DC outputs 21 on each receiver 12) and may be incorporated as a separate termination module or "dongle" 15. This configuration maintains a constant line-to-line resistance and capacitance regardless of the number of receivers 12.

In this configuration, if the dongle 15 is removed, the PET transmitter 16 can be configured to process the condition as an electrical fault and interrupt power. The same fault will be processed if the transmission lines are disconnected between the transmitter 16 and the first receiver 12' or between any of the receivers 12.

In particular embodiments, communication 18 is included between the transmitter 16 and a plurality of receivers 12. The communication method can assume any of a number of forms, including wireless, optical, communication-over-power-line; or a unique form of communication can be employed during the PET sample period, as described in U.S. Pat. No. 9,184,795 B2, titled, "Packet Energy Transfer In-line Communications". The communication capability can be used to determine if a receiver 12 attached to the transmission lines is a valid device. By having all of the receivers 12 communicate their power draw back to the transmitter 16 and comparing the sum of the power draws to the power leaving the terminals of the transmitter 16, it can be determined if there is an unexpected load on the transmission lines due to an invalid receiver 12 or a sensor fault.

In additional embodiments, the dongle 15 is provided with the circuitry to communicate with the transmitter 16 and to return a unique identifier to the transmitter 16. If the unique identifier is not detected by the transmitter 16, the transmitter 16 interrupts power to the transmission lines due to the absence of a valid dongle 15. The unique identifier provides an extra safeguard protecting the unlikely event of a capacitor-resistor combination being unintentionally attached to the transmission lines, thus mimicking a dongle 15, or an intentional manipulation of the system safeguards with a counterfeit dongle 15.

Figure 5:
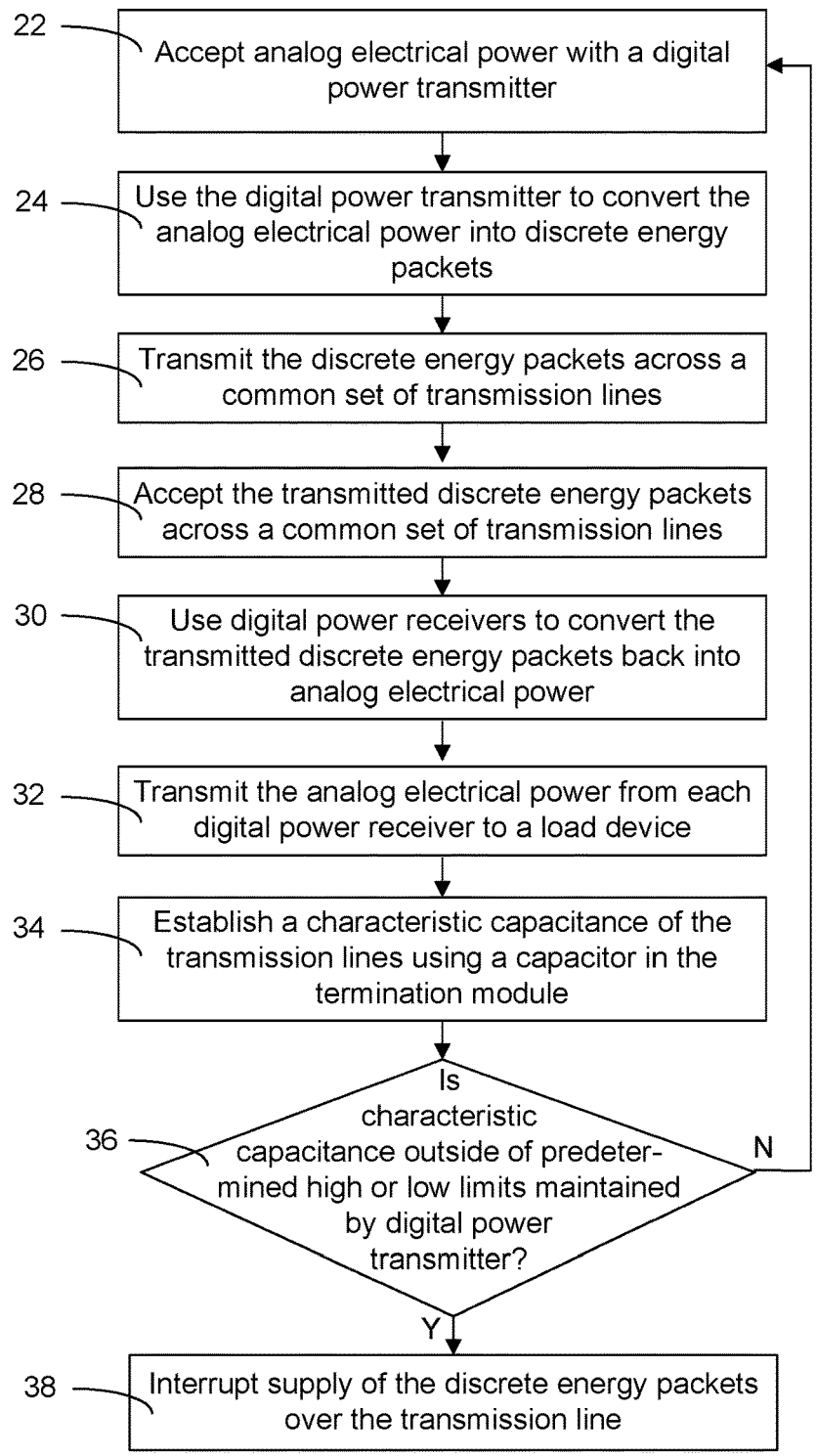
FIG. 5 is a flow chart showing the steps in a method for parallel operation of packet energy transfer receivers in a digital power distribution system.

In a method of this disclosure, as shown in FIG. 5, a digital power transmitter accepts 22 analog electrical power and converts 24 the analog electrical power into discrete energy packets, which are then transmitted 26 across a common set of transmission lines, which accept 28 these transmitted packets. Digital power receivers convert 30 the transmitted discrete energy packets back into analog electrical power, which is transmitted 32 from each digital power receiver to a load device. The characteristic capacitance of the transmission lines is established 34 using a capacitor in a termination module. If the characteristic capacitance is determined 38 to be outside predetermined high or low limits maintained by the digital power transmitter, supply of the discrete energy packets over the transmission line is interrupted 38.

Computer/Software Control:

The source controller 11 and load controller 17 can include a logic device, such as a microprocessor, microcontroller, programmable logic device or other suitable digital circuitry for executing control algorithms that effect the actions described herein. The load controller 17 may take the form of a simple sensor node that collects data relevant to the load side of the system. It does not necessarily require a microprocessor.

The controllers 11 and 17 can be computing devices and the systems and methods of this disclosure can be implemented in a computing system environment. Examples of well-known computing system environments and components thereof that may be suitable for use with the systems and methods include, but are not limited to, personal computers, server computers, hand-held or laptop devices, tablet devices, smart phones, multiprocessor systems, microprocessor-based systems, set top boxes, programmable consumer electronics, network PCs, minicomputers, mainframe computers, distributed computing environments that include any of the above systems or devices, and the like. Typical computing system environments and their operations and components are described in many existing patents (e.g., U.S. Pat. No. 7,191,467, owned by Microsoft Corp.).

The methods may be carried out via non-transitory computer-executable instructions, such as program modules. Generally, program modules include routines, programs, objects, components, data structures, and so forth, that perform particular tasks or implement particular types of data. The methods may also be practiced in distributed computing environments where tasks are performed by remote processing devices that are linked through a communications network. In a distributed computing environment, program modules may be located in both local and remote computer storage media including memory storage devices.

The processes and functions described herein can be non-transitorially stored in the form of software instructions in the computer. Components of the computer may include, but are not limited to, a computer processor, a computer storage medium serving as memory, and a system bus that couples various system components including the memory to the computer processor. The system bus can be of any of several types of bus structures including a memory bus or memory controller, a peripheral bus, and a local bus using any of a variety of bus architectures.

The computer typically includes one or more of a variety of computer-readable media accessible by the processor and including both volatile and nonvolatile media and removable and non-removable media. By way of example, computer-readable media can comprise computer-storage media and communication media.

The computer storage media can store the software and data in a non-transitory state and includes both volatile and nonvolatile, removable and non-removable media implemented in any method or technology for storage of software and data, such as computer-readable instructions, data structures, program modules or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed and executed by the processor.

The memory includes computer-storage media in the form of volatile and/or nonvolatile memory such as read only memory (ROM) and random access memory (RAM). A basic input/output system (BIOS), containing the basic routines that help to transfer information between elements within the computer, such as during start-up, is typically stored in the ROM. The RAM typically contains data and/or program modules that are immediately accessible to and/or presently being operated on by the processor.

The computer may also include other removable/non-removable, volatile/nonvolatile computer-storage media, such as (a) a hard disk drive that reads from or writes to non-removable, nonvolatile magnetic media; (b) a magnetic disk drive that reads from or writes to a removable, nonvolatile magnetic disk; and (c) an optical disk drive that reads from or writes to a removable, nonvolatile optical disk, such as a CD ROM or other optical medium. The computer-storage medium can be coupled with the system bus by a communication interface, wherein the interface can include, e.g., electrically conductive wires and/or fiber-optic pathways for transmitting digital or optical signals between components. Other removable/non-removable, volatile/nonvolatile computer storage media that can be used in the exemplary operating environment include magnetic tape cassettes, flash memory cards, digital versatile disks, digital video tape, solid state RAM, solid state ROM, and the like.

The drives and their associated computer-storage media provide storage of computer-readable instructions, data structures, program modules and other data for the computer. For example, a hard disk drive inside or external to the computer can store an operating system, application programs, and program data.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties or other values are specified herein for embodiments of the invention, those parameters or values can be adjusted up or down by $1/100^{th}$, $1/50^{th}$, $1/20^{th}$, $1/10^{th}$, $1/5^{th}$, $1/3^{rd}$, $1/2$, $2/3^{rd}$, $3/4^{th}$, $4/5^{th}$, $9/10^{th}$, $19/20^{th}$, $49/50^{th}$, $99/100^{th}$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention. Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

I claim:

1. A digital power distribution system, comprising:
   a) a common set of transmission lines;
   b) a digital power transmitter configured to accept an analog electrical power and to convert the analog electrical power into discrete energy packets for distribution across the common set of the transmission lines;
   c) a plurality of digital power receivers with parallel connections to the common set of the transmission lines, wherein the digital power receivers are configured to accept the energy packets from the digital power transmitter and to convert the packets back into an analog electrical power;
   d) a load device electrically coupled with at least one of the digital power receivers and configured to receive the analog electrical power from the digital power receiver with which it is electrically coupled; and
   e) a termination module with parallel connections to the common set of the transmission lines, wherein the termination module includes at least a capacitor configured to establish the characteristic capacitance of the transmission lines.

2. The digital power distribution system of claim 1, wherein each digital power receiver includes a controller configured to monitor at least that digital power receiver's electrical current and to disconnect that digital power receiver's output from the load device if the electrical current is greater than a predetermined maximum value.

3. The digital power distribution system of claim 1, wherein a loss of connection to the termination module results in a change in the characteristic capacitance or resistance of the transmission lines, and if the characteristic capacitance falls outside of predetermined high or low limits maintained by the digital power transmitter, the digital power transmitter is configured to act to interrupt power supply to the transmission lines.

4. The digital power distribution system of claim 1, wherein at least one of the digital power receivers is in communication with the digital power transmitter to communicate parameters that include at least one of the electrical current, voltage and power being drawn by the load connected to the receiver or a unique identifier for the digital power receiver.

5. The digital power distribution system of claim 4, wherein the digital power transmitter is configured to inhibit power to the transmission lines unless the electrical power being supplied by the digital power transmitter correlates to the summation of individual power levels that are reported by the digital power receiver.

6. The digital power distribution system of claim 5, wherein the digital power transmitter is configured to not provide power to the transmission lines unless the electrical power being supplied by the digital power transmitter corresponds to the summation of individual power levels that are reported by all of the digital power receivers and unless all of the unique identifiers reported by the digital power receivers correspond to a list of acceptable identifiers maintained in the digital power transmitter.

7. The digital power distribution system of claim 1, wherein the termination module is a dongle in communication with the digital power transmitter and is configured to communicate a unique identifier for the dongle, and wherein the digital power transmitter is configured act to interrupt power to the transmission lines if the unique dongle identifier is not detected.

8. A method for parallel operation of packet energy transfer receivers in a digital power distribution system, comprising:

a) accepting an analog electrical power with a digital power transmitter;
b) using the digital power transmitter to convert the analog electrical power into discrete energy packets;
c) transmitting the discrete energy packets across a common set of transmission lines;
d) accepting the transmitted discrete energy packets with a plurality of digital power receivers;
e) using the digital power receivers to convert the transmitted discrete energy packets back into an analog electrical power;
f) transmitting the analog electrical power from each digital power receiver to a load device;
g) establishing a characteristic capacitance of the transmission lines using a capacitor in the termination module;
h) determining whether a characteristic capacitance is outside of predetermined high or low limits maintained by the digital power transmitter; and
i) when the characteristic capacitance is outside the predetermined high or low limit, interrupting supply of the discrete energy packets over the transmission line.

9. The method of claim 8, further comprising:

a) monitoring an electrical current from at least one of the digital power receivers; and
b) when the monitored electrical current is greater than a predetermined maximum value, disconnecting that digital power receiver's output from the load device.

* * * * *

UNITED STATES PATENT AND TRADEMARK OFFICE
CERTIFICATE OF CORRECTION

PATENT NO. : 10,468,879 B2
APPLICATION NO. : 15/412219
DATED : November 5, 2019
INVENTOR(S) : Stephen Spencer Eaves Page 1 of 1

It is certified that error appears in the above-identified patent and that said Letters Patent is hereby corrected as shown below:

In the Claims

In Claim 7, at Column 9, Line 26, insert -- to -- between "configured" and "act".

In Claim 8, at Column 10, Line 16-17, replace "the temination module" with "a termination module".

In Claim 8, at Column 10, Line 21, replace "the characteristic capacitance" with "a characteristic capacitance".

In Claim 8, at Column 10, Line 23, replace "transmission line" with "transmission lines".

Signed and Sealed this
Second Day of June, 2020

Andrei Iancu
*Director of the United States Patent and Trademark Office*